US010572192B2

(12) United States Patent
Watanabe

(10) Patent No.: US 10,572,192 B2
(45) Date of Patent: Feb. 25, 2020

(54) PROCESSING SYSTEM, PROCESSING APPARATUS, TERMINAL, AND NON-TRANSITORY COMPUTER READABLE MEDIUM

(71) Applicant: FUJI XEROX CO., LTD., Tokyo (JP)

(72) Inventor: Tsuyoshi Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 343 days.

(21) Appl. No.: 15/584,721

(22) Filed: May 2, 2017

(65) Prior Publication Data

US 2018/0024784 A1 Jan. 25, 2018

(30) Foreign Application Priority Data

Jul. 22, 2016 (JP) ................................ 2016-144504

(51) Int. Cl.
*G06F 15/16* (2006.01)
*G06F 3/12* (2006.01)
(Continued)

(52) U.S. Cl.
CPC .......... *G06F 3/1204* (2013.01); *G06F 3/1222* (2013.01); *G06F 3/1225* (2013.01); *G06F 3/1238* (2013.01); *G06F 3/1292* (2013.01); *G06F 3/1293* (2013.01); *G06F 3/1454* (2013.01); *G06F 9/44526* (2013.01); *G06Q 10/10* (2013.01); *H04B 5/0031* (2013.01); *H04N 1/00106* (2013.01);
(Continued)

(58) Field of Classification Search
CPC .... G06F 3/1204; G06F 3/1205; G06F 3/1218; G06F 3/1222; G06F 3/1225; G06F 3/1257; G06F 3/1292; G06F 3/1293; G06F 3/1423; G06F 3/1454; H04B 5/0031; H04N 1/00106; H04N 1/00278; H04N 1/00408; H04N 1/00411; H04N 1/00413; H04N 1/00503; H04N 1/00514; H04N 1/00952; H04N 1/00973
See application file for complete search history.

(56) References Cited

U.S. PATENT DOCUMENTS

2009/0164999 A1* 6/2009 Tsuboi ............... H04N 1/00307 718/101
2010/0069008 A1 3/2010 Oshima et al.
(Continued)

FOREIGN PATENT DOCUMENTS

JP 2002-288109 A 10/2002
JP 2009-151686 A 7/2009
(Continued)

*Primary Examiner* — Jonathan A Bui
(74) *Attorney, Agent, or Firm* — Oliff PLC

(57) ABSTRACT

A processing system includes a terminal held by a user and a processing apparatus that executes a process designated by the user. The terminal includes a memory that stores screen information for configuring a setting screen for the process. The screen information is set by the user. The processing apparatus includes an acquisition unit and a receiving unit. The acquisition unit acquires the screen information from the terminal through short-distance wireless communication. The receiving unit displays the setting screen in accordance with the acquired screen information and receives a setting change performed by the user on the setting screen.

18 Claims, 7 Drawing Sheets

(51) Int. Cl.

| | |
|---|---|
| ***G06F 3/14*** | (2006.01) |
| ***G06F 9/445*** | (2018.01) |
| ***G06Q 10/10*** | (2012.01) |
| ***H04B 5/00*** | (2006.01) |
| ***H04N 1/00*** | (2006.01) |

(52) U.S. Cl.

CPC ..... *H04N 1/00204* (2013.01); *H04N 1/00278* (2013.01); *H04N 1/00421* (2013.01); *H04N 1/00424* (2013.01); *H04N 1/00435* (2013.01); *H04N 1/00477* (2013.01); *H04N 1/00482* (2013.01); *H04N 1/00503* (2013.01); *H04N 1/00514* (2013.01); *H04N 1/00938* (2013.01); *H04N 1/00952* (2013.01); *H04N 1/00973* (2013.01); *H04N 1/00307* (2013.01); *H04N 2201/006* (2013.01); *H04N 2201/0039* (2013.01); *H04N 2201/0041* (2013.01); *H04N 2201/0048* (2013.01); *H04N 2201/0049* (2013.01); *H04N 2201/0091* (2013.01); *H04N 2201/0096* (2013.01)

(56) References Cited

U.S. PATENT DOCUMENTS

| | | | | |
|---|---|---|---|---|
| 2013/0083358 | A1* | 4/2013 | Suzuki | H04W 76/10 358/1.15 |
| 2015/0103376 | A1* | 4/2015 | Saeda | G06F 3/1253 358/1.15 |
| 2016/0212103 | A1* | 7/2016 | Rhoads | H04W 12/02 |
| 2016/0269576 | A1* | 9/2016 | Norota | H04N 1/00307 |
| 2017/0070642 | A1* | 3/2017 | Miyamoto | B41J 29/38 |
| 2017/0149873 | A1* | 5/2017 | Jang | H04N 21/4402 |
| 2018/0070389 | A1* | 3/2018 | Morgan | G06F 9/452 |
| 2018/0115826 | A1* | 4/2018 | Suyama | H04Q 9/00 |
| 2019/0158693 | A1* | 5/2019 | Saeda | G06F 3/1253 |

FOREIGN PATENT DOCUMENTS

| | | | |
|---|---|---|---|
| JP | 2010-098717 | A | 4/2010 |
| JP | 2014-026163 | A | 2/2014 |
| JP | 2014-216957 | A | 11/2014 |

* cited by examiner

FIG. 4

| | | MEANING | UUID | Value |
|---|---|---|---|---|
| Service | | | 9A8FD........ | |
| Characteristic | InformationRequest | TERMINAL-INFORMATION ACQUISITION REQUEST | 5B305........ | |
| | ClientInformation | TERMINAL INFORMATION | DEBB0........ | RSSI, DeviceName |
| | JobDataWriteRequest | SCREEN-INFORMATION ACQUISITION REQUEST | 61ED8........ | JobType, PINCode |
| | JobDataReadRequest | SCREEN-INFORMATION UPDATE REQUEST | 02A1F........ | JobType |
| | JobData | SCREEN INFORMATION | 61AF8........ | Settings (JSON) |

PROCESSING SYSTEM, PROCESSING APPARATUS, TERMINAL, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-144504 filed Jul. 22, 2016.

BACKGROUND

(i) Technical Field

The present invention relates to a processing system, a processing apparatus, a terminal, and a non-transitory computer readable medium.

(ii) Related Art

Various parameter settings for functions such as copying and scanning may be configured on processing apparatuses such as multi-function products (an apparatus having combined functions of a printer, scanner, copier, and fax machine, and other apparatuses). For example, even the copying function has multiple parameters such as paper size, number of copies, one-sided/double-sided printing, color/monochrome, and print density. Moreover, default parameter values are registrable in multiple processing apparatuses. In such processing apparatuses, only when intending to use a set value different from the default value, a user may perform an operation to change the setting. However, the default set values are provided on a processing-apparatus basis and not a user basis. If a user frequently uses multiple parameter values different from the default values, the user heeds to perform operations for changing multiple parameter settings every time the user uses the processing apparatus.

If the user uses a terminal to perform a setting operation for a process to be executed by the processing apparatus and to transmit, to the processing apparatus, settings information acquired by performing the setting operation, the settings for the process need to be completed on the terminal. In addition, in recent years, terminals including a minimal user interface (UI) (for example, a very small screen), such as a wearable wrist terminal, have become widely used. It is difficult to display, on such a terminal including the minimal UI, a screen for configuring various parameter settings for a process to be executed by the processing apparatus. Even if the screen is displayed, it is not practical for a user to perform setting operations through a touch operation or the like to select parameters displayed at a very small size on the screen.

SUMMARY

According to an aspect of the invention, there is provided a processing system including a terminal held by a user and a processing apparatus that executes a process designated by the user. The terminal includes a memory that stores screen information for configuring a setting screen for the process. The screen information is set by the user. The processing apparatus includes an acquisition unit and a receiving unit. The acquisition unit acquires the screen information from the terminal through short-distance wireless communication. The receiving unit displays the setting screen in accordance with the acquired screen information and receives a setting change performed by the user on the setting screen.

BRIEF DESCRIPTION OF THE DRAWINGS

An exemplary embodiment of the present invention will be described in detail based on the following figures, wherein:

FIG. 4 is a table illustrating an example of a generic attribute (GATT) profile used by the system according to the exemplary embodiment;

DETAILED DESCRIPTION

Figure 1:
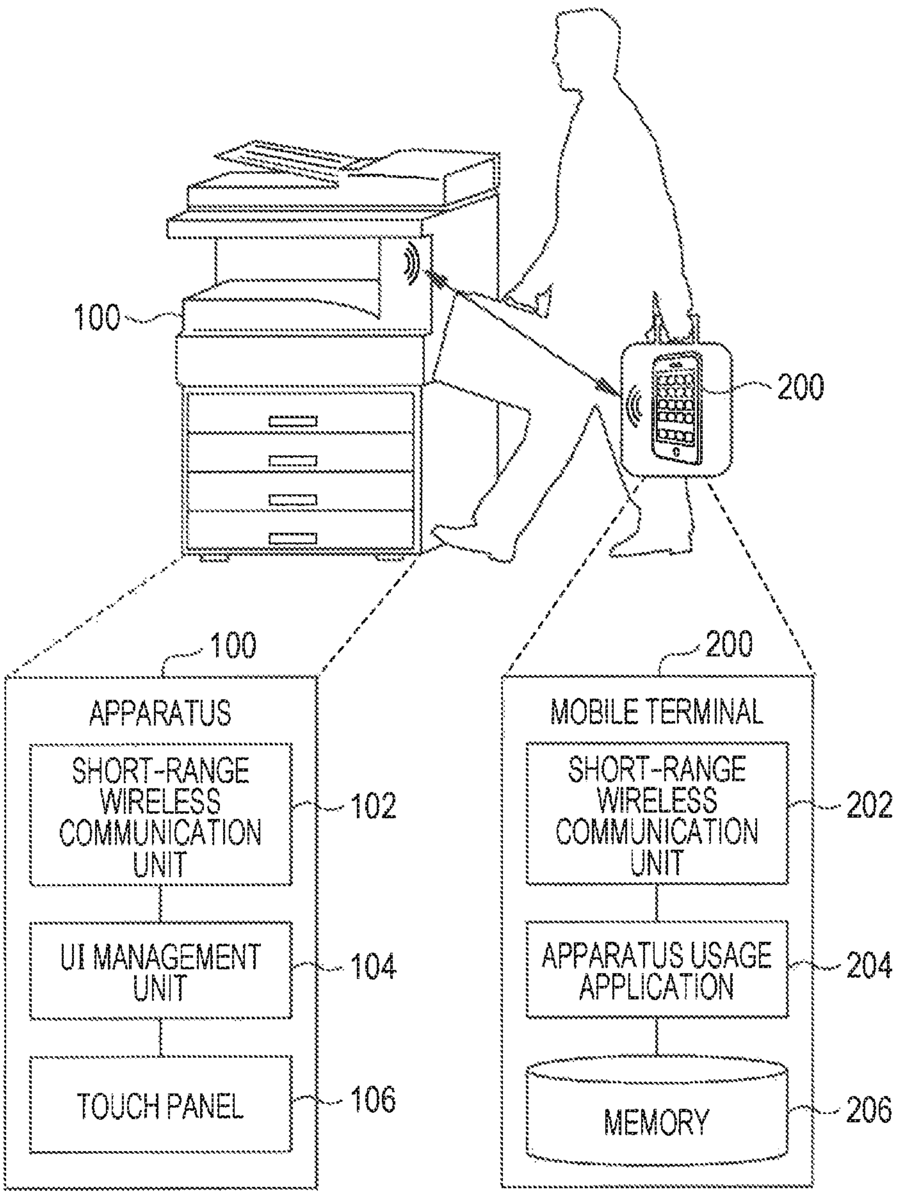
FIG. 1 is a diagram illustrating an example configuration of a system according to an exemplary embodiment.

As illustrated in FIG. 1, a system according to an exemplary embodiment includes an apparatus 100 and a mobile terminal 200.

The apparatus 100 provides a user with services. The apparatus 100 has a UI mechanism for locally receiving a user operation. Although FIG. 1 illustrates a touch panel 106 as an example of the UI mechanism, the UI mechanism is not limited to a touch panel and may be a combination of a display with a mechanical button or numeric keys. Examples of the apparatus 100 include a copier, a printer, a scanner, a fax machine, a multi-function product having these functions, and a multimedia terminal.

The apparatus 100 includes a short-range wireless communication unit 102, a UI management unit 104, and the touch panel 106. In FIG. 1, various function modules of the apparatus 100 that are not directly related to a process according to the exemplary embodiment are not illustrated.

The short-range wireless communication unit 102 performs wireless data communication in a relatively short distance. In the exemplary embodiment, a Bluetooth (trademark) module supporting Bluetooth Low Energy (trademark) (hereinafter, abbreviated as "BLE") is used as an example of the short-range wireless communication unit 102. However, this is merely an example, and radio equipment supporting another wireless communication standard may be used in such a manner that a function provided using BLE is implemented by an application.

The UI management unit 104 performs information processing for the UI of the apparatus 100. The UI management unit 104 has functions of generating a UI screen to be displayed on the touch panel 106 and receiving input performed by the user on the displayed UI screen. For example, the UI management unit 104 displays a menu screen, a detail setting screen, and other screens on the touch panel 106 and receives input from the user. The menu screen is used to receive selection of the type (such as copying or scanning)

of a job the execution of which is intended by the user (that is, a process to be executed by the apparatus 100). The detail setting screen is used to receive input of detail parameters (such as paper size, number of copies, print density, and scan data storage location) of the selected job type. The UI management unit 104 delivers the details of input from the user (the job type and the parameters) to a controller (not illustrated) that performs control for executing the job, and this enables the controller to perform control in accordance with the details of the input.

The UI management unit 104 according, to the exemplary embodiment also has a function for configuring a setting screen specially the user of the mobile terminal 200 in accordance with screen information (described in detail later) for the user that is received from the mobile terminal 200. Note that the setting screen is a screen displayed when the apparatus 100 receives input from the user and includes the detail parameter setting screen, the menu screen, and other screens as exemplified above.

Under the control of the UI management unit 104, the touch panel 106 displays various setting screens and screens each for indicating a state or the like of the apparatus 100 and thus receives input performed by the user on the corresponding screen.

The mobile terminal 200 is an information processing apparatus carried by the user. Examples of the mobile terminal 200 include a smartphone, a tablet terminal, and a wearable wrist device.

The mobile terminal 200 includes a short-range wireless communication unit 202, an apparatus usage application 204, and a memory 206. In FIG. 1, function modules of the mobile terminal 200 that are not directly related to the process according to the exemplary embodiment are not illustrated.

The short-range wireless communication unit 202 performs wireless data communication in a relatively short distance in accordance with the same communication protocol as that used by the short-range wireless communication unit 102. Hereinafter, a case where a Bluetooth module having a function supporting BLE is used as an example of the short-range wireless communication unit 202 will be described.

The apparatus usage application 204 is application software that performs information processing related to the use of the apparatus 100. The apparatus usage application 204 provides the apparatus 100 with screen information set by the user to specify the corresponding setting screen of the apparatus 100 in particular and updates (or registers) the screen information regarding the mobile terminal 200 in response to an update (or registration) request transmitted from the apparatus 100.

The memory 206 stores the screen information set by the user of the mobile terminal 200. The memory 206 is, for example, a nonvolatile memory such as a flash memory built in the mobile terminal 200. The memory 206 may also store information other than the screen information.

An example of data that is stored in the memory 206 and that relates to the exemplary embodiment will be described with reference to FIG. 2.

A dedicated memory area 2060 for the apparatus usage application 204 is reserved in the memory 206. The dedicated memory area 2060 is used to store information used by only the apparatus usage application 204 (hereinafter, referred to as "dedicated information") (described in detail later) from among the operating system and applications installed on the mobile terminal 200.

The memory 206 also stores information such as a terminal name 2072 and an address book 2074 that are shared by the apparatus usage application 204, other applications installed on the mobile terminal 200, and the operating system (hereinafter, referred to as "shared information"). The terminal name 2072 is, for example, the name of the mobile terminal 200 set by the user at the time of the initial setting for the mobile terminal 200. The address book 2074 is a list of names of persons with whom the user frequently communicates and address information regarding the persons (such as phone numbers and e-mail addresses).

Figure 2:
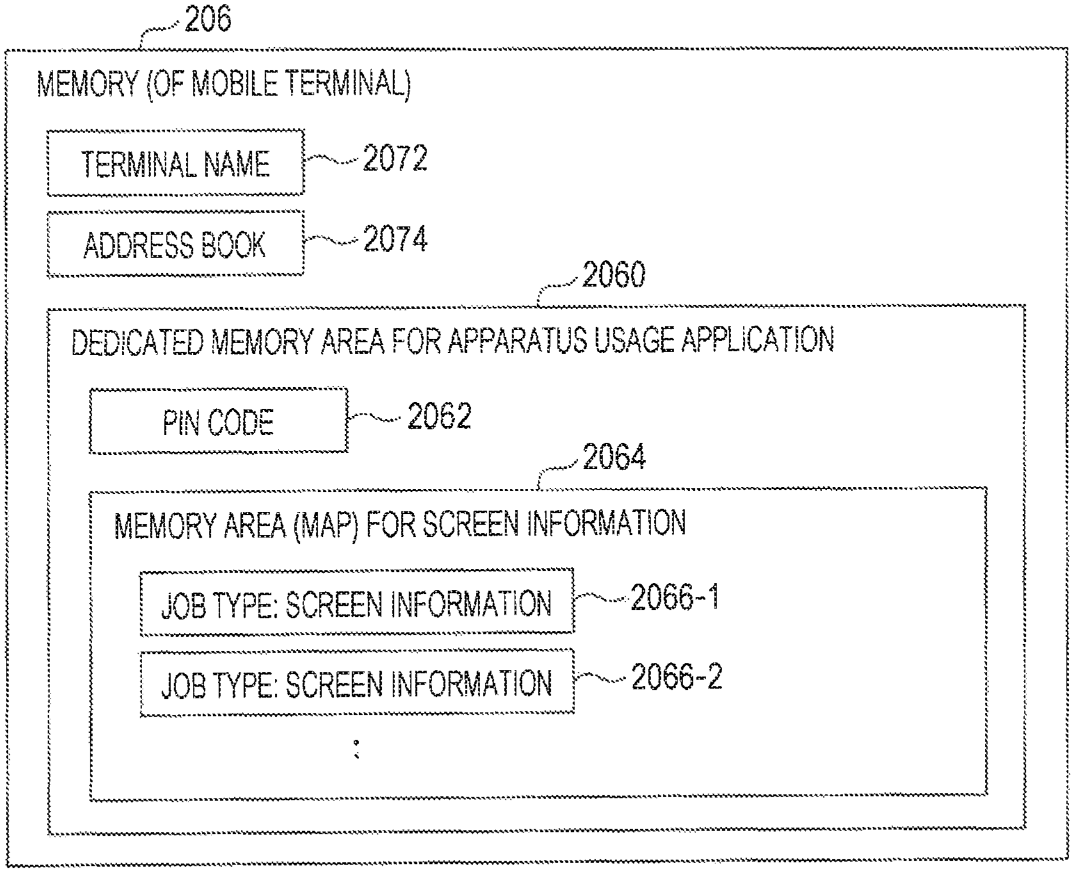
FIG. 2 is a diagram illustrating an example of what is stored in a memory of a mobile terminal.

In the example in FIG. 2, the dedicated memory area 2060 includes a memory area 2062 for a PIN code and a memory area 2064 for screen information.

A PIN code stored in the memory area 2062 is a secret code number registered by the user for the apparatus usage application 204. The user inputs the PIN code in the apparatus 100, and the apparatus 100 transmits a request including the PIN code to the mobile terminal 200 and thereby verifies that the apparatus 100 is an apparatus actually operated by the user.

In the example illustrated in FIG. 2, the memory area 2064 for screen information is used to store pieces of screen information 2066-1, 2066-2, . . . (collectively referred to as screen information 2066 when not being discriminated from each other) on a per-job-type basis such as for a Printing job, a Scan (Scan to Email) job, a Scan (Scan to Box) job, and a Fax transmission job. The pieces of screen information specify the respective setting screens to be displayed by the apparatus 100. The pieces of screen information held by the mobile terminal 200 are customized for the user of the mobile terminal 200. A piece of screen information for a specific job type includes, for each parameter of the job type, information regarding a default value selected by the user for the parameter, a selection list, or a selection range. The default value is a value frequently used (or intended to be typically used) as a parameter value by the user. The selection list has multiple values typically used as parameter values by the user. The selection range is a range of values typically used as parameter values by the user and is specified by using, for example, an upper limit and a lower limit of the range. Note that one default value and either a selection list or a selection range may also be set for one parameter. As described above, the pieces of screen information 2066 in the memory area 2064 are customized in accordance with the intension of the user.

Hereinafter, an example of the screen information 2066 regarding a job type that is Scan (Scan to Email) set for a specific user will be described. Note that the job type that is Scan (Scan to Email) corresponds to a job for transmitting an e-mail to a designated e-mail address with a scanned image attached to the e-mail.

{"Plex": "Tumble", "ImageMode": "Photo", "FileFormat": "TIFF", "Subjects":["Report", "Estimate", "Invoice"], "SenderName": "Taro Fuji", "SenderAddress": "FujiTaro@example.jp"}

The screen information in this example is described in JavaScript Object Notation (JSON) or a similar data description language and enumerates pairs of a key (Name) and a value on a per-parameter basis. For example, the parameter "ImageMode" is a parameter for designating an image mode used for scanning. In this example, "Photo" is designated as the value of the parameter. The parameter "Subjects" denotes the subject of an e-mail to be transmitted for data regarding a scan result. In the aforementioned example, a selection list having three values that, are "Report", "Estimate", and "Invoice" is set for the parameter "Subjects". Parameters "SenderName" and "SenderAddress" respectively denote the sender name and the sender address of the e-mail to be transmitted with the scanned image attached thereto. In addition, instruction information for incorporating, into screen information, data regarding the name and the e-mail address of a destination in the address book 2074 that is the shared information is associated with the screen information for "Scan (Scan to Email)", although this is omitted in the aforementioned example.

In the job-service execution system according to the exemplary embodiment, the apparatus 100 and the mobile terminal 200 respectively serve as Peripheral and Central in the BLE protocol. The apparatus 100 regularly transmits (advertises) a signal (an advertising packet in BLE) indicating that the apparatus 100 is an apparatus that executes a job in the system. If multiple users are present near the apparatus 100, multiple mobile terminals 200 might receive the advertising signal simultaneously. Upon receiving the signal from the apparatus 100, each mobile terminal 200 notifies the apparatus 100 of information from which the mobile terminal 200 is identifiable (such as a terminal name or the signal receiving strength). On the basis of the information notified from each mobile terminal 200, the apparatus 100 identifies one of the mobile terminals 200 of the user locally operating the apparatus 100 and acquires the corresponding screen information from the mobile terminal 200. The apparatus 100 generates a setting screen for the user in accordance with the acquired screen information and displays the setting screen on the touch panel 106. The displayed setting screen includes a default value, a selection list, or a selection range specified for each parameter in the screen information. For example, if a default value is set for a parameter, the default value is displayed on the setting screen in a state where the default value has been selected or input in an input field. If a selection list is set for a parameter, a menu having options in the selection list (such as a pull-down menu) is displayed. If a selection range is set for a parameter, a scale or the like enabling designation of a value in the selection range. The user checks the display of the dedicated setting screen by using the touch panel 106. If the user intends to change the value of a parameter, the user performs an operation for changing the value by using the touch panel 106. After the intended settings are determined, the user performs an operation such as pressing the start button and thereby instructs the apparatus 100 to start a job corresponding to the settings.

Figure 3:
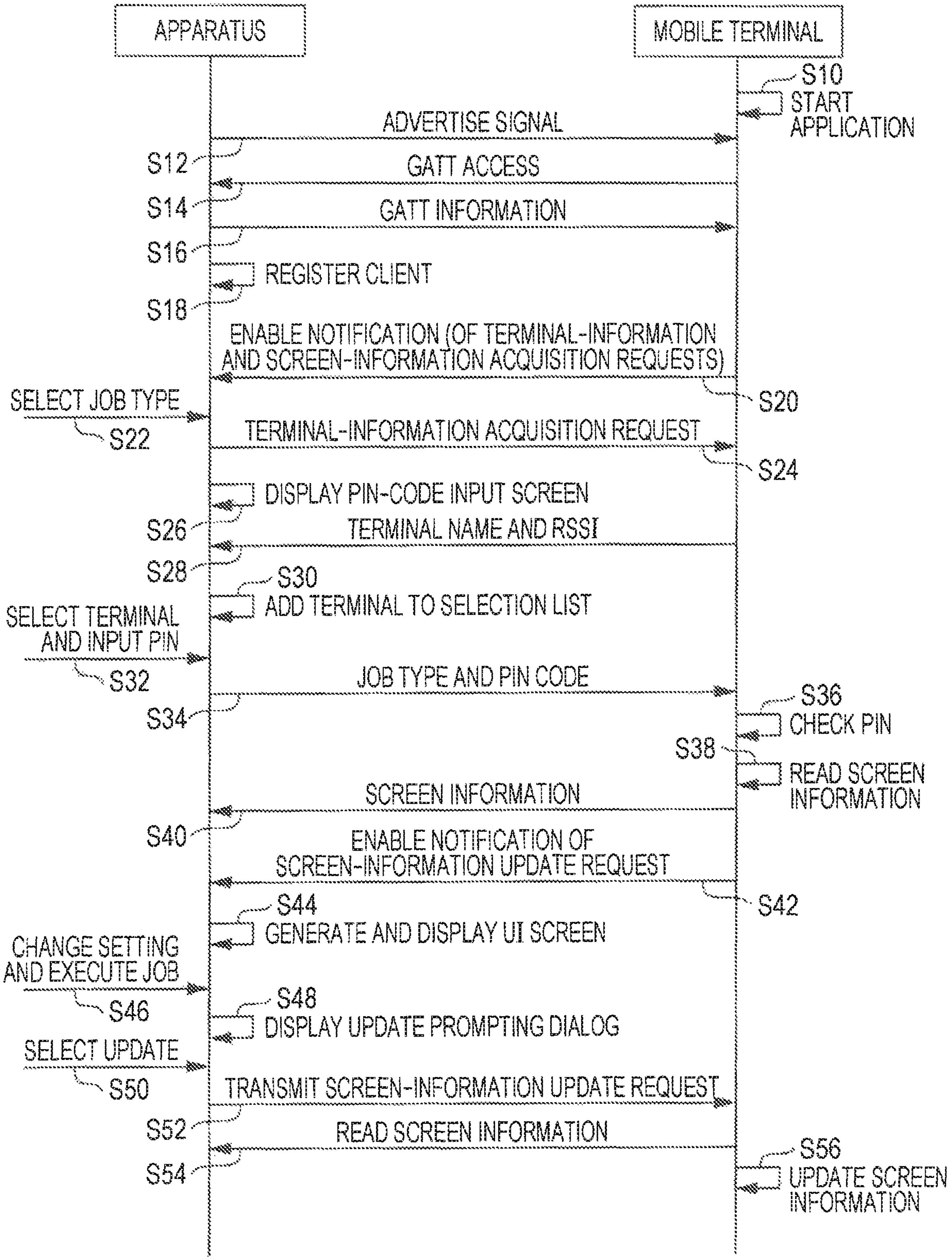
FIG. 3 is a flowchart of process steps performed in the exemplary embodiment.

Specific process steps according to the exemplary embodiment will be described with reference to FIG. 3.

In the process, a user has started the apparatus usage application 204 installed on their mobile terminal 200 (S10). The running apparatus usage application 204 waits for a BLE advertising packet (including the universally unique identifier (UUID) of the job-execution service according to the exemplary embodiment) to be received from the apparatus 100. The user of the mobile terminal 200 is walking toward the apparatus 100 to execute an intended job.

The short-range wireless communication unit 102 (Bluetooth module) of the apparatus 100 serves as a GATT server. FIG. 4 illustrates an example of the GATT profile of the GATT server. The GATT profile has a UUID of the job-execution service according to the exemplary embodiment (Service) and characteristics used in the service (Characteristic). In this example, the GATT profile has five characteristics respectively indicating a terminal-information acquisition request, terminal information, a screen-information acquisition request, a screen-information update request, and screen information. Each characteristic is assigned a unique UUID and has a specified value (or a group of specified values). For example, the characteristic "ClientInformation" (terminal information) has values of RSSI (a received signal strength indicator) and DeviceName (a terminal name). The characteristic "JobData" (screen information) has a value (Settings described in JSON) corresponding to screen information specifying the setting screen as described above.

The short-range wireless communication unit 102 of the apparatus 100 regularly transmits (advertises) an advertising packet including the UUID of the job execution service in accordance with BLE (S12).

Upon receiving the advertising packet from the apparatus 100, the short-range wireless communication unit 202 of each of multiple mobile terminals 200 near the apparatus 100 acquires the RSSI regarding the reception. If the RSSI is higher than a predetermined threshold, the short-range wireless communication unit 202 accesses (searches for the service on) the short-range wireless communication unit 102 of the apparatus 100 to start GATT communication (S14). If the RSSI is equal to or lower than the threshold, the corresponding mobile terminal 200 is too far from the apparatus 100 and does not communicate with the apparatus 100 any more.

In response to the service search performed by the mobile terminal 200, the short-range wireless communication unit 102 of the apparatus 100 transmits information regarding the data structure of the GATT profile held by the short-range wireless communication unit 102 (see FIG. 4) (S16). The short-range wireless communication unit 102 also registers (stores), as an accessing client, any mobile terminal 200 (short-range wireless communication unit 202) that is accessing the short-range wireless communication unit 102 (S18).

The short-range wireless communication unit 202 of the mobile terminal 200 instructs the apparatus 100 (short-range wireless communication unit 102) to enable notifications of the terminal-information acquisition request and the screen-information acquisition request in the acquired data structure of the GATT profile (notification enabling) (S20). If the conditions for transmitting the requests are satisfied, the short-range wireless communication unit 102 transmits the requests to the mobile terminal 200 (short-range wireless communication unit 202).

Figure 5:
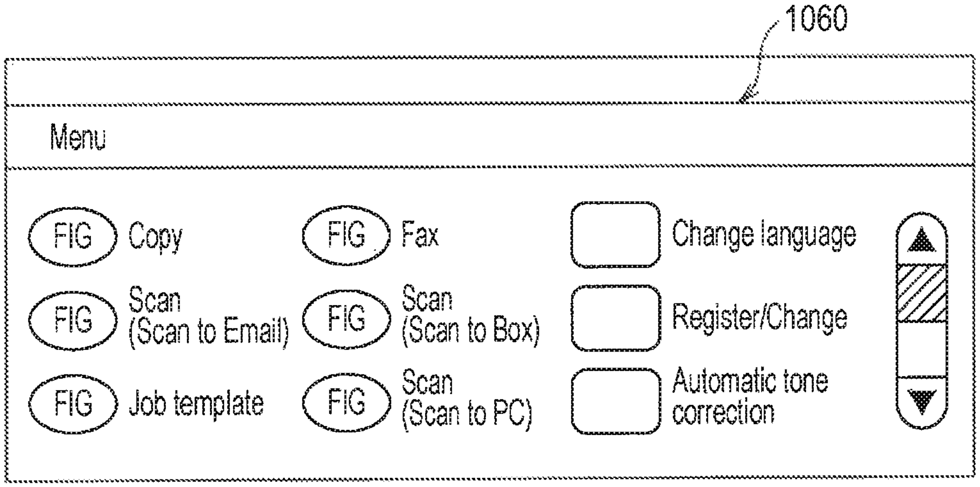
FIG. 5 is a diagram illustrating an example main-menu screen of an apparatus.

The user arrives at the apparatus 100 and uses a main-menu screen 1060 displayed on the touch panel 106 of the apparatus 100 (see FIG. 5) to select a job type intended to be executed (S22). A case where, at this time, the user presses a button for the job type "Scan (Scan to Email)" on the main-menu screen 1060 illustrated in FIG. 5 will hereinafter be described as a specific example.

Figure 6:
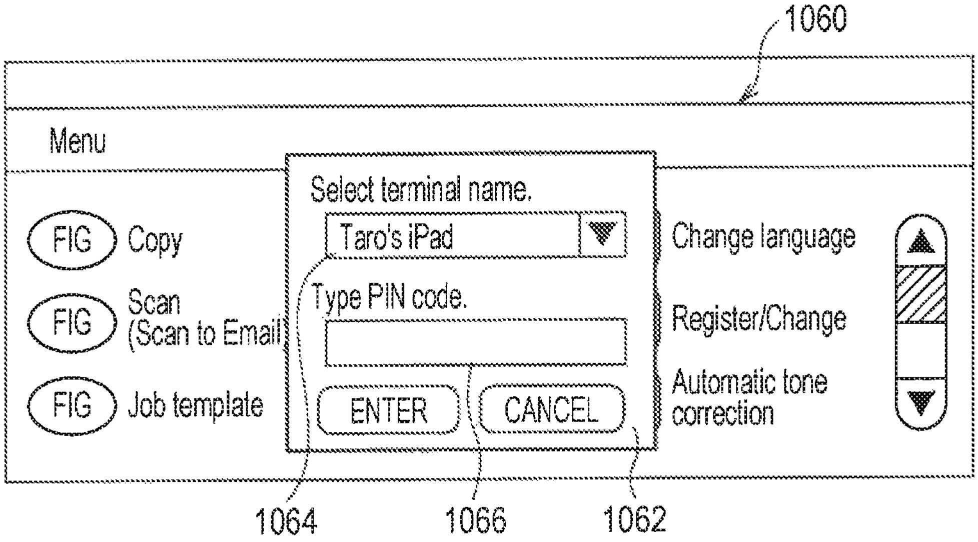
FIG. 6 is a diagram illustrating an example of a personal identification number (PIN)-code input screen.

Upon recognizing that a job is selected on the main-menu screen, the UI management unit 104 of the apparatus 100 notifies the short-range wireless communication unit 102 that a job is selected (in other words, instructs the short-range wireless communication unit 102 to transmit a terminal-information acquisition request). Upon receiving the notification, the short-range wireless communication unit 102 transmits the terminal-information acquisition request (InformationRequest, see FIG. 4) to each registered accessing client (mobile terminal 200) (S24). In parallel with S24, the UI management unit 104 displays a PIN-code input screen 1062 on the touch panel 106 (S26). FIG. 6 illustrates an example of the display of the PIN-code input screen 1062. In this example, the PIN-code input screen 1062 is displayed as a pop-up dialog on the main-menu screen 1060. The PIN-code input screen 1062 includes a pull-down menu 1064 for selecting the terminal name of the mobile terminal 200 of the user and an input field 1066 for a PIN code.

Upon receiving the terminal-information acquisition request from the apparatus 100, the short-range wireless communication unit 202 of the mobile terminal 200 transmits, to the short-range wireless communication unit 102, terminal information (ClientInformation, see FIG. 4) in response to the request (S28). The terminal information includes the terminal name 2072 stored in the memory 206 and the RSSI of the signal received from the apparatus 100. The short-range wireless communication unit 102 of the apparatus 100 writes, to the GATT profile (FIG. 4) managed by the apparatus 100, as a value of the characteristic "ClientInformation", the terminal information received from the mobile terminal 200.

The UI management unit 104 of the apparatus 100 adds each terminal name transmitted back from the corresponding accessing mobile terminal 200 to the list of terminal name options (S30). The UI management unit 104 displays the terminal names in the list as options in the pull-down menu 1064 for terminal names on the PIN-code input screen 1062. In other words, if multiple users are present near the apparatus 100 when the terminal-information acquisition request is transmitted in S24, the mobile terminals 200 of the respective users transmit the responses in S28 (including the terminal name and the like), and the terminal names of the mobile terminals 200 are displayed in the pull-down menu 1064. In the pull-down menu 1064, the terminal names may be arranged in the descending order of the RSSI. One of the users having the mobile terminal 200 exhibiting the highest RSSI is highly likely to be present closest to the apparatus 100.

The user selects the terminal name of their mobile terminal 200 in the pull-down menu 1064 on the PIN-code input screen 1062 and inputs a PIN code (registered by the user for the mobile terminal 200) in the input field 1066 (S32). The UI management unit 104 delivers the input. PIN code to the short-range wireless communication unit 102 and instructs the short-range wireless communication unit 102 to transmit the screen-information acquisition request (JobDataWriteRequest, see FIG. 4). In response to the instruction, the short-range wireless communication unit 102 transmits the screen-information acquisition request including the PIN code to the short-range wireless communication unit 202 of the mobile terminal 200 having the terminal name (S34). Note that the UI management unit 104 may also instruct the short-range wireless communication unit 102 to transmit identification information regarding the selected job type in addition to the PIN code. In this case, the identification information regarding the job type is also transmitted to the mobile terminal 200.

Upon receiving the screen-information acquisition request, the short-range wireless communication unit 202 of the mobile terminal 200 checks whether the PIN code included in the request matches the PIN code in the memory area 2062 for the PIN code stored in the memory 206 (S36). If the PIN code included in the request does not match the stored PIN code, the short-range wireless communication unit 102 of the apparatus 100 returns an error (for example, null character data) (not illustrated). If the error repeatedly occurs a predetermined number of times in succession, the short-range wireless communication unit 202 disconnects the communication with the short-range wireless communication unit 102 of the apparatus 100.

If the PIN code received from the short-range wireless communication unit 102 of the apparatus 100 matches the stored PIN code, the short-range wireless communication unit 202 reads out the pieces of screen information 2066 (see FIG. 2) stored in the memory 206 (S38) and responds to the short-range wireless communication unit 102 (S40). If the identification information regarding the job type is included in the screen-information acquisition request received from the short-range wireless communication unit 102 of the apparatus 100, the short-range wireless communication unit 202 of the mobile terminal 200 may extract, from the pieces of screen information 2066 in the memory area 2064, only one of the pieces of screen information 2066 regarding the job type corresponding to the identification information. The short-range wireless communication unit 202 may then respond to the apparatus 100.

If the screen information 2066 includes instruction information for incorporating one of the pieces of shared information (for example, the address book 2074 in FIG. 2) into the screen information, the short-range wireless communication unit 202 generates screen information including the screen information 2066 that is the dedicated information and the shared information in the memory 206 (S38) and responds to the apparatus 100 (S40). For example, in the case of the job type "Scan (Scan to Email)", the short-range wireless communication unit 202 merges the dedicated information including the default value of the image mode, the subject selection list, and the like that are exemplified above with a list of names and e-mail addresses that are extracted from the address book, that is, the shared information, and thereby generates such screen information as to be exemplified below. Note that the address information listed at the top of the address book is address information regarding the user of the mobile terminal 200, and the screen information transmitted in the response includes, at the top of the shared information part, the address information regarding the user listed at the top of the address book.

{"Plex":" Tumble", "ImageMode": "Photo", "FileFormat":
"TIFF", "Subjects":["Report", "Estimate", "Invoice"],
"SenderName": "Taro Fuji", "SenderAddress":
"FujiTaro@example.jp",
"Addresses":[{"Name":"Hanako Fuji",
"Address":"hanako@example.jp"},
{"Name":"Jito Suzuki", "Address":"Jiro@example,jp"},
{"Name":"Saburo Sato", "Address":"Saburo@example.jp"},
{"Name":"Shiro Tanaka", "Address":"Shiro@example.jp"}]}

The short-range wireless communication unit 202 transmits the generated screen information to the apparatus 100.

The short-range wireless communication unit 202 instructs the apparatus 100 (short-range wireless communication unit 102) to enable a notification of a screen-information update request (see FIG. 4) to the mobile terminal 200 (S42). If the condition for transmitting the screen-information update request is satisfied, the short-range wireless communication unit 102 transmits the request to the mobile terminal 200 (short-range wireless communication unit 202).

Upon receiving the screen information from the mobile terminal 200 in S40, the short-range wireless communication unit 102 of the apparatus 100 reflects the screen information in the GATT profile (see FIG. 4). For example, if the screen information received from the mobile terminal 200 has only the screen information 2066 corresponding to the job type selected by the user in S22 (and the shared information used for setting the job type, if any), the screen information corresponding to the job type (and the shared information, if any) is written as screen information to the GATT profile. The UI management unit 104 generates display information regarding the UI screen by using the screen information acquired from the mobile terminal 200 and displays the UI screen on the touch panel 106 in accordance with the display information (S44). In other words, the UI management unit 104 sets, as values of corresponding parameters in the UI management information managed by the UI management unit 104, the information regarding the default value, the selection list, and the selection range that are included in the screen information. Before displaying the UI screen, the UI management unit 104 reflects, in the input fields for the parameters on the screen, the values of the corresponding parameters for the screen from among the parameters in the UI management information.

Figure 7:
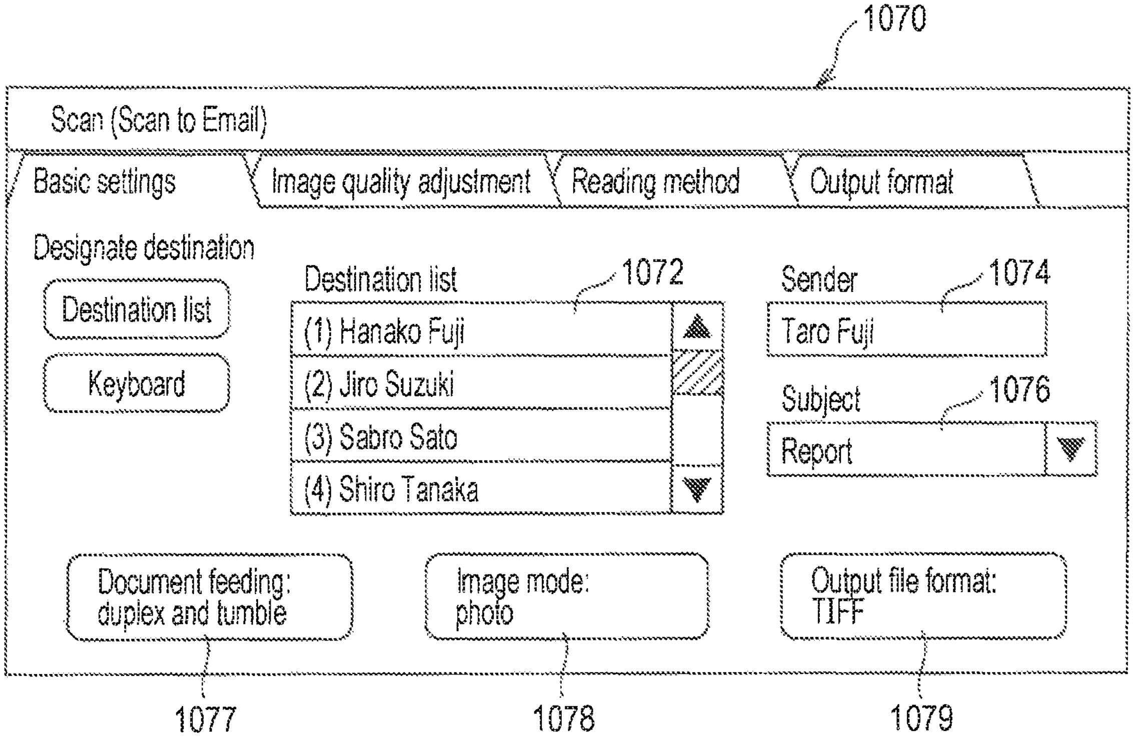
FIG. 7 is a diagram illustrating an example screen for setting a Scan (Scan to Email) job.

For example, if the job type "Scan (Scan to Email)" is selected in S22, the UI management unit 104 displays a UI screen 1070 for "Scan (Scan to Email)" illustrated in FIG. 7 on the touch panel 106 in accordance with the screen information regarding "Scan (Scan to Email)" (the result of merging the dedicated information with the address book that is the shared information as exemplified as above) from among the pieces of screen information received from the mobile terminal 200. The UI screen 1070 includes a destination list 1072, a sender input field 1074, a subject input field 1076, a document-feed setting button 1077, an image-mode setting button 1078, an output-file-format setting button 1079, and the like. The UI management unit 104 displays, as a list, that is, in the destination list 1072, the names of destinations (or the address information) included in the shared information (the address book part) included in the received screen information and thus receives selection of a transmission destination of data to be scanned, the selection being performed from the destination list 1072. The UI management unit 104 also sets, in the sender input field 1074, the value of the sender name ("SenderName") in the screen information. In addition to this, the UI management unit 104 holds the value of the sender address ("SenderAddress") in the screen information for a setting of a sender address of an e-mail to be generated. The UI management unit 104 also displays, in the subject input field 1076, a pull-down menu indicating three options in the subject selection list "Subjects": ["Report", "Estimate", "Invoice"] included in the screen information. From the pull-down menu displayed in the subject input field 1076, the user selects the subject of the e-mail to which a scanned document is to be attached.

The document-feed setting button 1077 is a graphical user interface (GUI) button for setting a document feeding method for scanning. The document-feed setting button 1077 indicates the document feeding method in the current setting. The document-feed setting button 1077 illustrated in FIG. 7 indicates that "duplex and tumble" is set in accordance with document feeding information "Plex": "Tumble" (document feeding: duplex and tumble) included in the screen information received from the mobile terminal 200. To change the document feeding method, the user may press the document-feed setting button 1077 to open a document-feeding setting screen (not illustrated) and select an intended document feeding method on the screen. The image-mode setting button 1078 is a GUI button for setting an image mode for scanning and indicates the current image mode. The image-mode setting button 1078 illustrated in the example in FIG. 7 indicates that the current image mode is a "Photo" mode set in accordance with the image-mode information "ImageMode": "Photo" (image mode: photo) included in the screen information, transmitted from the mobile terminal 200. To change the image mode, the user may press the button to call an image-mode setting screen (not illustrated) and change the image mode on the setting screen. The output-file-format setting button 1079 is a GUI button for setting the file format of a data image to be output as a scanning result and indicates the current output-file format. The example illustrated in FIG. 7 indicates that the current output-file format is "TIFF" set in accordance with output-file-format information "FileFormat": "TIFF" (file format: TIFF) included in the screen information transmitted from the mobile terminal 200. To change the output-file format, the user may press the button to call an output-file-format setting screen (not illustrated) and change the output-file format on the setting screen.

Figure 8:
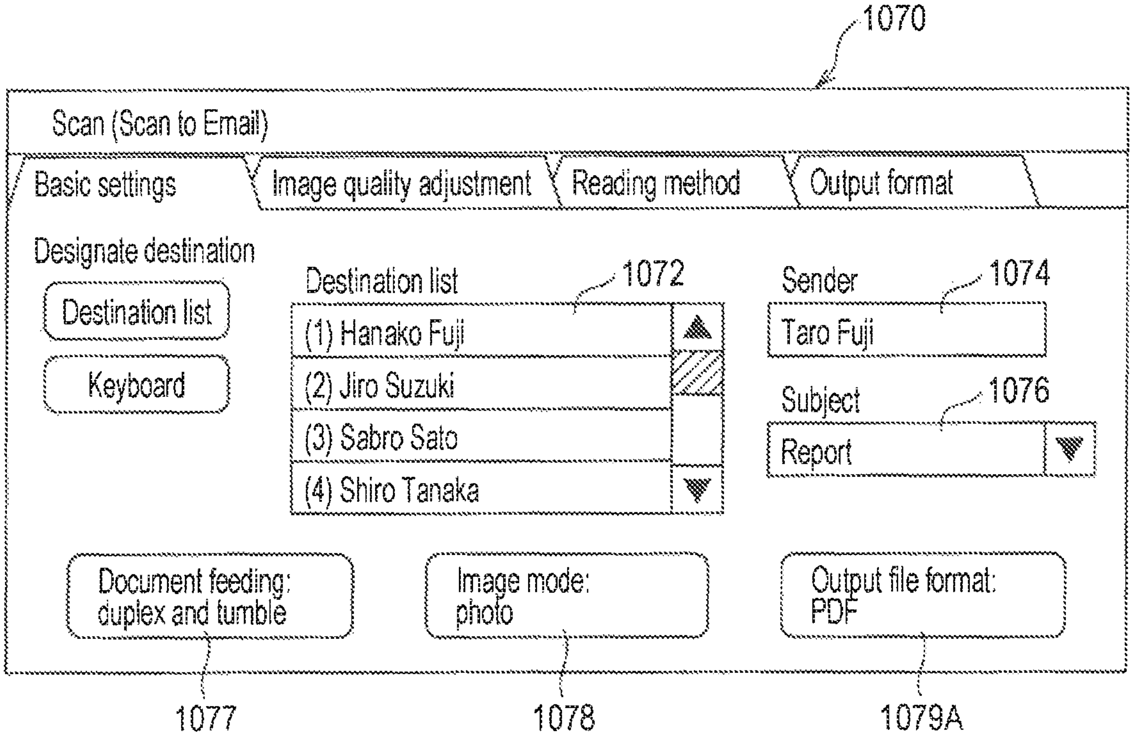
FIG. 8 is a diagram illustrating a setting screen displaying a state after the change of a setting for the output-file format.

While looking at the UI screen on the touch panel 106 indicating information (such as a default value and a selection list) that is customized by the user and is then reflected, the user selects one of options (such as the destination list 1072 or the subject input field 1076) or changes a set value (in the document-feed setting button 1077 or the like), as necessary. For example, the user presses the output-file-format setting button 1079 to open the output-file-format setting screen and changes the output-file format from TIFF to PDF. After the completion of the change in the setting, the touch panel 106 displays the UI screen 1070 for "Scan (Scan to Email)" illustrated in FIG. 8. An output-file-format button 1079A on the screen indicates that PDF has been set as the output-file format. After changing the setting, the user places a document in the document feeder and presses the start button (not illustrated) (S46).

After the start button is pressed, the apparatus 100 executes the process designated by the user by controlling a processing mechanism (for example, the scanner unit) in the apparatus 100 in accordance with the values of the parameters included in the UI management information managed by the UI management unit 104. In the Scan (Scan to Email) example described above, the apparatus 100 reads a document placed in the document feeder in the duplex mode, performs image processing in the photo mode on an image acquired by the reading, and converts the resultant image into a file in the PDF format. The apparatus 100 then attaches the file to an e-mail for which the destination selected from the destination list 1072 has been set (the transmission source and the subject have also been set in accordance with the screen information transmitted from the mobile terminal 200) and transmits the email.

If the user does not change, in S46, any default value of a parameter of the screen information transmitted from the mobile terminal 200 to the apparatus 100, the series of processing is terminated after the completion of job execution.

Figure 9:
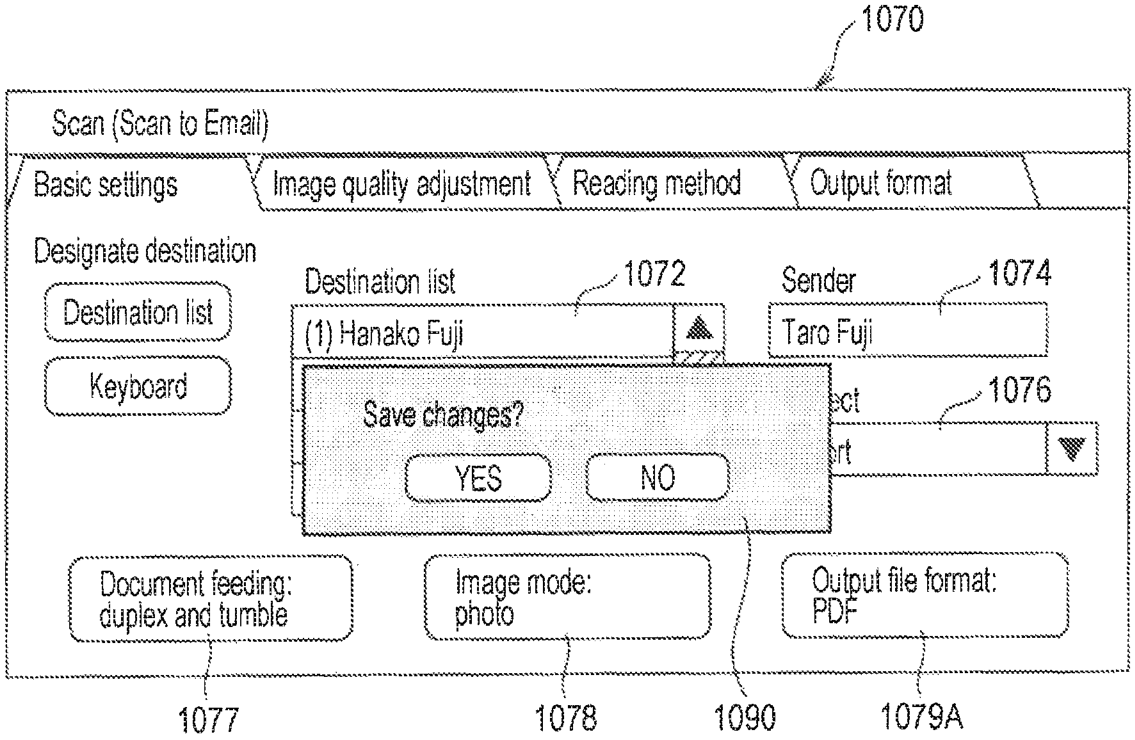
FIG. 9 is a diagram illustrating an example of a settings change dialog.

In contrast, if the user changes, on the touch panel 106, a default value of a parameter designated in the screen information transmitted from the mobile terminal 200, the UI management unit 104 displays an update prompting dialog on the touch panel 106 after the start (or the completion) of the job execution (S48). For example, if the user changes the output-file format from TIFF set as the default value for the user to PDF and instructs the apparatus 100 to start scanning, the UI management unit 104 displays an update prompting dialog 1090 as a pop-up dialog on the UI screen 1070 for Scan (Scan to Email) as illustrated in FIG. 9. The update prompting dialog 1090 includes a message ("Save changes?") inquiring whether to save a changed set value as the default value in the mobile terminal 200 and GUI buttons for selecting an answer to the inquiry ("YES" or "NO").

If the user selects the option to not save the changed setting through the update prompting dialog 1090 (NO), the apparatus 100 does not proceed to any further step and terminates the series of process steps performed between the apparatus 100 and the mobile terminal 200.

In contrast, if the user selects the option to save the changed setting through the update prompting dialog 1090 (YES) (S50), the UI management unit 104 instructs the short-range wireless communication unit 102 to update the screen information in the GATT profile (see FIG. 4) and to transmit the screen-information update request. In response, the short-range wireless communication unit 102 reflects the UI management information held at the time by the UI management unit 104 in the screen information in the GATT profile (for example, the screen information is overwritten with the UI management information). Note that among the pieces of UI management information held by the UI management unit 104, only one or more parameters of the GATT profile corresponding to the one or more parameters having undergone the change in the setting in S46 are reflected. For example, if a parameter set for the job type "Scan (Scan to Email)" is changed, parameters for the other job types such as printing and fax transmission in the UI management information are not reflected in the parameters of the GATT profile. In addition, note that the screen information in the GATT profile has not only parameters having default values but also parameters including information regarding a range selectable by the user, such as a selection list and a selection range. The value of the parameter in the UI management information corresponding to such a parameter in the GATT profile (the value is a result of selection from the selection list or the like) may be prevented from being reflected in the parameter having the information regarding the selection range in the GATT profile. The short-range wireless communication unit 102 then transmits the screen-information update request to the communication counterpart (mobile terminal 200) for which the notification of the screen-information update request has been enabled (S42) (S52).

Upon receiving the screen-information update request, the short-range wireless communication unit 202 of the mobile terminal 200 reads the screen information from the GATT profile (see FIG. 4) held by the apparatus 100 (S54). The short-range wireless communication unit 202 updates the screen information 2066 in the memory 206 with the screen information thus read (556).

Note that the short-range wireless communication unit 202 may be configured not to read shared information (the address book information in the example described above) of the screen information in the GATT profile of the apparatus 100. The shared information in the mobile terminal 200 is used also by applications other than the apparatus usage application 204. Rewriting the shared information influences the other applications, and thus the shared information may not be rewritten. Since the shared information in the mobile terminal 200 is not rewritten as described above, the short-range wireless communication unit 202 of the mobile terminal 200 does not read the shared information even if the apparatus 100 changes the shared information. Alternatively, the following configuration may be used. Specifically, the shared information is not originally included in the screen information in the GATT profile, and the shared information is not written to the GATT profile in both S40 and S50.

In the process steps described above, transmission of the terminal-information acquisition request by the apparatus 100 (S24) is triggered by the user's selection of the job to be executed on the main-menu screen 1060 of the apparatus 100 (S22), and the apparatus 100 acquires information such as the terminal name from each mobile terminal 200 near the apparatus 100 (S26). When the user selects the job, the selected job is generally executed. Accordingly, the pieces of information collected from the nearby mobile terminals 200 when the user selects the job are highly likely to include the information of the mobile terminal 200 of the user operating the apparatus 100, and the collected pieces of information are likely to be utilized. The trigger for transmitting the terminal-information acquisition request is not limited to the job selection operation and may be another operation indicating that the user intends to execute a job on the apparatus 100. Examples of the operation include user operations locally performed on the UI of the apparatus 100 such as pressing a power-save-mode cancellation button of the apparatus 100, placing a document in the document feeder, and touching any button on the main-menu screen.

As an alternative way of collecting pieces of information, the short-range wireless communication unit 102 may, for example, regularly transmit the terminal-information acquisition request regardless of a user operation locally performed on the apparatus 100. However, in this case, the pieces of information collected by the apparatus 100 from the nearby mobile terminals 200 are highly likely not to be utilized.

Note that the aforementioned mechanism according to the exemplary embodiment functions even if the memory area 2064 for screen information in the dedicated memory area 2060 of the mobile terminal 200 is empty (that is, all the parameters of the screen information have not been set). In this case, the screen information provided from the mobile terminal 200 to the apparatus 100 in S40 in FIG. 3 indicates that the screen information does not include any of the pieces of screen information 2066 in the dedicated memory area 2060 (or information indicating that the pieces of screen information 2066 are empty) but that the screen information might include the shared information such as the address book 2074. If the screen information acquired from the mobile terminal 200 does not have a part corresponding to the dedicated information (the screen information 2066 in the dedicated memory area 2060), the UI management unit 104 of the apparatus 100 generates and displays, in S44, a UI screen including default values set in the apparatus 100 for parameters for the dedicated information. The user then performs settings of a job by using the displayed UI screen. After the settings are determined, the user instructs the apparatus 100 to start the job. In this case, the screen information (the part corresponding to the dedicated information) is empty, and this setting operation thus corresponds to an operation for changing the settings. Accordingly, the UI management unit 104 displays the update prompting dialog 1090 (see FIG. 9) in S48. If the user intends to use, as default screen information in the mobile terminal 200, the settings just configured on the UI screen of the apparatus 100, the user performs an operation for indicating the intention to change the settings in the update prompting dialog 1090 (pressing "YES"). This causes the settings received by the UI management unit 104 to be written to the screen information in the GATT profile. The mobile terminal 200 reads the screen information in the GATT profile and stores the screen information in the dedicated memory area 2060.

The exemplary embodiment of the present invention has heretofore been described. The exemplified information processing mechanism of the apparatus 100 and the mobile terminal 200 is implemented by causing a computer to execute a program representing the aforementioned functions of the apparatuses. The computer has a circuit configuration in which hardware components are connected to each other, for example, via a bus, the components including, for example, a microprocessor such as a central processing unit (CPU), memories (primary memories) such as a random-access memory (RAM) and a read-only memory (ROM), a controller that controls a fixed memory such as a flash memory, a solid-state drive (SSD), or a hard disk drive (HDD), various input-output (I/O) interfaces, a network interface for control for connection to a network such as a local area network. The program describing processes of the functions of these components is stored in the fixed memory such as the flash memory via the network or the like and is installed on the computer. The program stored in the fixed memory is loaded in the RAM and then executed by the microprocessor such as the CPU, and the function modules exemplified above are thereby implemented.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing system comprising:

a terminal held by a user and a processing apparatus that executes a process designated by the user, the terminal including a memory that stores screen information for configuring a setting screen for the process, the screen information being set by the user, the processing apparatus comprising a processor programmed to:

acquire the screen information from the terminal through short-distance wireless communication, display the setting screen in accordance with the acquired screen information, and receives a setting change performed by the user on the setting screen, wherein the terminal further includes a processor programmed to, if the screen information is not present in the memory, store screen information corresponding to settings information in the memory, the settings information being provided by the processing apparatus.

2. The processing system according to claim 1, wherein if the processing apparatus receives a specific operation from the user, the processor of the processing apparatus is programmed to acquire the screen information from the terminal.

3. The processing system according to claim 2, wherein the screen information stored in the memory includes pieces of type screen information respectively provided for process types of processes executable by the processing apparatus, wherein if the processing apparatus receives, as the specific operation, an operation for selecting one of the process types of a corresponding one of the processes that is to be executed, the processor of the processing apparatus is further programmed to acquire, from the terminal, one of the pieces of type screen information that corresponds to the selected process type, and wherein the processor of the processing apparatus is programmed to display, as the setting screen, a type setting screen generated for the selected process type in accordance with the acquired piece of type screen information.

4. The processing system according to claim 1, wherein the terminal further stores identification information that verifies authorization to acquire the screen information, wherein the processor of the processing apparatus is further programmed to receive an input of the identification information from the user and that transmits the received identification information to the terminal, and wherein if the identification information transmitted from the processing apparatus matches the stored identification information, the terminal provides the processing apparatus with the screen information.

5. The processing system according to claim 1, wherein the processor of the processing apparatus is further programmed to provide the terminal with settings information held in association with the setting screen, the settings information being provided after execution of the process is started in accordance with the settings information, and wherein the processor of the terminal is further programmed to update the screen information in the memory with the settings information provided by the processing apparatus.

6. The processing system according to claim 5, wherein the screen information includes dedicated information used for a process for configuring a setting on the processing apparatus and shared information used for a process to be executed by the terminal besides the process for configuring a setting on the processing apparatus, and wherein the processor of the terminal is further programmed to only update the dedicated information of the screen information in the memory with the settings information provided by the processing apparatus.

7. The processing system according to claim 1, wherein the processor of the processing apparatus is further programmed to provide the terminal with settings information held in association with the setting screen, the settings information being provided after execution of the process is started in accordance with the settings information.

8. A processing apparatus comprising:

a processor programmed to:

acquire, from a terminal held by a user through short-distance wireless communication, screen information for configuring a setting screen for the process, the screen information being set by the user;

display the setting screen in accordance with the acquired screen information and that receives a setting change performed by the user on the setting screen; and provide the terminal with settings information held in association with the setting screen, the settings information being provided after execution of the process is started in accordance with the settings information.

9. The processing apparatus according to claim 8, wherein if the processing apparatus receives a specific operation from the user, the acquisition unit acquires the screen information from the terminal.

10. The processing apparatus according to claim 9, wherein pieces of type screen information respectively provided for process types of processes are stored in a memory of the terminal, and if the processing apparatus receives, as the specific operation, an operation for selecting one of the process types of a corresponding one of the processes that is to be executed, the acquisition unit acquires, from the terminal, one of the pieces of type screen information that corresponds to the selected process type, and wherein the receiving unit displays, as the setting screen, a type setting screen generated for the selected process type in accordance with the acquired piece of type screen information.

11. The processing apparatus according to claim 8, further comprising:

an identification-information transmission unit that receives, from the user, input of identification information that verifies authorization to acquire the screen information, the identification-information transmission unit transmitting the received identification information to the terminal.

12. The processing apparatus according to claim 8, wherein the screen information includes dedicated information used for a process for configuring a setting on the processing apparatus and shared information used for a process to be executed by the terminal besides the process for configuring a setting on the processing apparatus, and wherein the settings-information provision unit provides the terminal with only information corresponding to the dedicated information, the information being included in the settings information.

13. A non-transitory computer readable medium storing a program causing a computer to execute a process, the computer being included in a processing apparatus that executes a process designated by a user, the process comprising:

acquiring, from a terminal held by the user through short-distance wireless communication, screen information for configuring a setting screen for the process, the screen information being set by the user;

displaying the setting screen in accordance with the acquired screen information and receiving a setting change performed by the user on the setting screen; and providing the terminal with settings information held in association with the setting screen, the settings information being provided after execution of the process is started in accordance with the settings information.

14. A terminal comprising:

a memory that stores screen information for configuring a setting screen for a process to be executed by a processing apparatus, the screen information being set by a user; and a processor programmed to provide the processing apparatus with the screen information; and store, in the memory, screen information corresponding to settings information held in association with the setting screen and provided by the processing apparatus, the processor storing the screen information after the processing apparatus starts execution of the process in accordance with the settings information.

15. The terminal according to claim 14, wherein the screen information stored in the memory includes pieces of type screen information respectively provided for process types of processes executable by the processing apparatus, and wherein the processor is further programmed to provide the processing apparatus with one of the pieces of type screen information regarding a corresponding one of the process types that is notified from the processing apparatus.

16. The terminal according to claim 14, further comprising:

a memory that stores identification information that verifies authorization to acquire the screen information, wherein if identification information transmitted from the processing apparatus matches the stored identification information, the processor is further programmed to provide the processing apparatus with the screen information.

17. The terminal according to claim 14, wherein the processor is further programmed to update the screen information in the memory with settings information held in association with the setting screen and provided by the processing apparatus, the processor updating the screen information after the processing apparatus starts execution of the process in accordance with the settings information.

18. The terminal according to claim 17, wherein the screen information includes dedicated information used for a process for configuring a setting on the processing apparatus and shared information used for a process to be executed by the terminal besides the process for configuring a setting on the processing apparatus, and wherein the processor is further programmed to only update the dedicated information in the screen information in the memory with the settings information provided by the processing apparatus.

* * * * *